UNITED STATES PATENT OFFICE 2,683,137

PRODUCTION OF WATER-DISPERSIBLE SULFONATES OF ALKENYL AROMATIC RESINS

Harold H. Roth, Bay City, Mich., assignor to The Dow Chemical Company, Midland, Mich., a corporation of Delaware No Drawing. Application June 11, 1951,
Serial No. 231,049

5 Claims. (Cl. 260—79.3)

This invention concerns an improved method for the sulphonation of benzene-soluble alkenyl aromatic resins to form water-dispersible resin sulphonates which have a property of thickening, i. e. increasing the viscosity of, water and other liquids in which they are dissolved or dispersed.

By an alkenyl aromatic resin is meant a solid, benzene-soluble resinous polymer or copolymer containing, in chemically combined form, 50 per cent by weight or more of at least one alkenyl aromatic compound having the general formula:

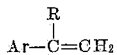

wherein Ar represents a monovalent aromatic radical and R represents hydrogen or a methyl radical. Examples of benzene-soluble alkenyl aromatic resins which may be sulphonated in accordance with the invention are the solid homopolymers of styrene, alpha-methylstyrene, ar-chlorostyrene, vinyltoluene, ar-ethyl-vinyl-benzene, and solid copolymers of two or more of such alkenyl aromatic compounds, e. g. copolymers of styrene and alpha-methylstyrene, or of styrene and ar-vinyltoluene, etc. The invention is concerned particularly with the sulphonation of polystyrene to a stage at which the sulphonated polystyrene is completely dispersible in water to thicken the latter.

Polystyrene and other alkenyl aromatic resins have heretofore been sulphonated by reaction with usual sulphonating agents such as concentrated sulphuric acid, fuming sulphuric acid, or chlorosulphonic acid, etc., but the methods employed are inconvenient, or produce sulphonated products that are poorly suited for use as thickening agents for water or other aqueous liquids. It may be mentioned that polystyrene can be sulphonated to obtain at least three distinctly different types of products, i. e. a polystyrene sulphonate which is insoluble, but swellable, by water; a polystyrene sulphonate which may be dispersed in water to form a colloidal solution of far greater viscosity than that of water; and a polystyrene sulphonate that dissolves in water without increasing greatly the viscosity of the water. Polystyrene has been sulphonated in the absence of solvents, but this usually results in formation of a badly discolored and non-uniformly sulphonated product comprising a mixture of two or more of the types of sulphonated polystyrene just mentioned. Polystyrene has also been sulphonated by gradually adding, with stirring, a highly reactive sulphonating agent such as chlorosulphonic acid to a fairly concentrated polystyrene solution, e. g. to a solution containing 10 weight per cent or more of polystyrene in a liquid polychlorinated hydrocarbon such as carbon tetrachloride or chloroform. Although this method may be carried out without appreciable discoloration of the product, it involves other disadvantages. When from 0.4 to 0.6 molecular equivalent of chlorosulphonic acid has been added per mole of styrene chemically combined in the polystyrene, the incompletely sulphonated polystyrene coagulates in the form of lumps, balls, or a sticky mass, and further sulphonation occurs at a relatively low rate and usually in a non-uniform manner. If the sulphonation is terminated when precipitation occurs, the product consists for the most part of a water-insoluble form of sulphonated polystyrene. If the sulphonation is continued after precipitation has taken place, e. g. by adding a further amount of sulphonating agent and stirring the mixture at the same or a higher temperature, the product usually consists either of a mixture of two or more of the above-mentioned types of polystyrene sulphonates, or of the type that dissolves in water but has little or no effect of thickening the solution to render it more viscous than water.

It is an object of this invention to provide an improved method whereby the aforementioned alkenyl aromatic resins may be sulphonated to form resin sulphonates which are completely dispersible in water and which, even when added in small amount to water, form colloidal solutions that are far more viscous than water. Other objects will be apparent from the following description of the invention.

I have found that such water-dispersible alkenyl aromatic resin sulphonates, having a pronounced thickening effect when added to water, may readily be produced by: (1) feeding into admixture with one another chlorosulphonic acid and a solution of an alkenyl aromatic resin in one or more liquid polychlorinated hydrocarbons having viscosities between 0.6 and 1, preferably between 0.8 and 1, centipoise at room temperature, in proportions corresponding to between 0.55 and 1.4 gram molecular equivalents of chlorosulphonic acid per gram equivalent of aromatic radicals in the resin, while (2) having the polychlorinated aliphatic hydrocarbon present in amount such as to form with the resin starting material a solution containing less than 8, preferably from 0.5 to 5, weight per cent of the resin and (3) maintaining the reaction mixture at temperatures between —10° and 40° C., preferably between 10° and 35° C.

By operating in this manner and under these conditions, the resin undergoes extremely rapid, i. e. almost instantaneous, sulphonation to a stage at which it contains an average of from 0.5 to 1.0, usually from 0.7 to 0.9, sulphonic acid radical per aromatic nucleus and it is such resin sulphonate that precipitates from the mixture. The precipitate is in the form of small granules, or crystals, which may readily be filtered from the mixture. The entire sulphonated resin product is readily dispersible in water to form a colloidal solution which is far more viscous that water.

However, in order to obtain such a result, it is important that all of the above-stated conditions be employed. For instance, it is important that the reaction medium consist for the most part of one or more polychlorinated hydrocarbons having the above viscosities, since the use of other organic liquids as media for the reaction frequently leads to formation of a sulphonated resin that is either insoluble in water or does not satisfactorily thicken the latter. Also, if the sulphonation is carried out at temperatures appreciably lower or higher than above-stated, a sulphonated resin is obtained which has relatively little effect of thickening water when added thereto. When the chlorosulphonic acid is added gradually to the resin solution, a precipitate is formed which consists of an incompletely sulphonated resin that is insoluble, or only partially dispersible, in water. A similar result is obtained when the resin starting material is used in amount corresponding to 10 per cent or more of the combined weight of the same and the polychlorinated aliphatic hydrocarbon employed as a reaction medium.

It may be mentioned that although the sulphonated alkenyl aromatic resins produced in accordance with the invention contain an average of from 0.5 to 1 sulphonate radical per aromatic nucleus and are dispersible in water to thicken the latter, it is possible by other methods to obtain corresponding sulphonated resins of similar sulphonate content that are not effective as thickening agents for water. Accordingly, the effectiveness of a sulphonated alkenyl aromatic resin as an agent for thickening water can be known only by actual test and cannot be estimated on a basis of the sulphonate content of the resin.

The method of the invention may be applied in sulphonating any benzene-soluble alkenyl aromatic resin in batchwise or continuous manner to obtain a corresponding resin sulphonate which is dispersible with water to thicken the latter. The invention will be explained more fully with reference to the sulphonation of polystyrene, it being understood that any other of the aforementioned alkenyl aromatic resins may similarly be sulphonated.

Chlorosulphonic acid, or a solution thereof in a liquid polychlorinated aliphatic hydrocarbon, and a solution of polystyrene in such polychlorinated hydrocarbon, are admixed in proportions corresponding to between 0.7 and 1.4, preferably from 0.7 to 1.2, molecular equivalents of chlorosulphonic acid per mole of styrene chemically combined in the polystyrene, while maintaining the mixture at temperatures between —10° and 40° C., preferably between 10° and 35° C. Any liquid polychlorinated hydrocarbon having a viscosity of from 0.8 to 1 centipoise at 20° C. may be used as the reaction medium. Examples of such media are carbon tetrachloride, methyl chloroform, ethylene chloride, ortho-dichlorobenzene, or tetrachloroethylene, or mixtures of two or more of such compounds, etc., but methyl chloroform is preferred.

It is important that the chlorosulphonic acid and the polystyrene be rapidly admixed, e. g. within 10 seconds, in the proportions just stated since the sulphonated polystyrene product is formed and precipitated almost immediately after bringing the reactants together. In practice, separate streams of a solution of the chlorosulphonic acid and a solution of polystyrene are preferably fed simultaneously to a mixing and reaction zone at rates such as to introduce the reactants in the proportions just stated. It is also important that the liquid polychlorinated hydrocarbon be present in amount such as to form, with the polystyrene, a solution containing not more than 8, and preferably from 0.5 to 5, per cent by weight of polystyrene.

The sulphonated polystyrene is formed as a fine granular precipitate which may be separated from the reaction liquor in usual ways, e. g. by filtration or by decanting. The product thus obtained is acidic, i. e. it is polystyrene sulphonic acid. It may be used to neutralize, and at the same time thicken, aqueous alkali solutions, or it may be added to water to form an acidic and relatively viscous colloidal solution. Alternatively, it may be converted to an ammonium or alkali metal salt thereof and the salt, e. g. an ammonium, sodium or potassium polystyrene sulphonate, be used as an agent for thickening water.

The following examples describe ways in which the invention has been practiced and illustrate certain of its advantages, but are not to be construed as limiting its scope.

*Example 1*

This example illustrates the importance of admixing the chlorosulphonic acid and the alkenyl aromatic resin reactants directly in the proportions required by the invention rather than gradually adding one of the reactants to the entire body of the other reactant. The resin used in all experiments of this example was solid polystyrene which, when dissolved in nine times its weight of toluene, formed a solution having a viscosity of 60 centipoises at 25° C. The viscosity of a 10 per cent solution of a polymer in toluene is hereinafter referred to as the "solution viscosity" of the polymer. In each of two experiments, a solution of 12.1 grams (0.1 mol) of chlorosulphonic acid in 146 grams of carbon tetrachloride was added gradually and with stirring to a solution of 10 grams of polystyrene (containing approximately 0.1 mol of chemically combined styrene) in 146 grams of carbon tetrachloride. In one of the experiments, the reaction mixture was maintained at approximately 30° C. during addition of the chlorosulphonic acid solution and until the reaction was considered complete, whereas the other experiment was carried out at a reaction temperature of —13° C. In both of the experiments, partially sulphonated polystyrene precipitated as a sticky mass when only from 40 to 60 per cent of the chlorosulphonic acid solution had been added and stirring then became difficult. However, the remainder of the chlorosulphonic acid solution was added and the mixture was stirred during, and for about an hour after, the addition. The mixture was then filtered to separate the sulphonated polystyrene product and the latter was dried, to free it of adhering liquor, by heating the same under vacuum. Approximately one part by weight of the product was added to 198 parts of water and the mixture was agitated. The sulphonated polystyrene which had been prepared at a reaction temperature of 30° C. dispersed in the water to form a colloidal solution which was more viscous than water. The sulphonated polystyrene that had been prepared at a reaction temperature of —13° C. was water-insoluble, i. e. it did not dissolve, or become dispersed in the water, or thicken the latter to an appreciable extent. Another portion of each product was weighed and neutralized with a measured amount of a one-normal aqueous sodium hydroxide solution. From the amounts of sodium hydroxide consumed in these neutralizations, it was calculated that the sulphonated polystyrene which had been prepared at 30° C. contained an average of 0.707 sulphonic acid radical per mole of styrene chemically combined therein and that the product which had been formed by the sulphonation at —13° C. contained an average of 0.694 sulphonic acid radical per mole of styrene chemically combined therein.

Another experiment was carried out as just described, except that the sulphonation was carried out at 30° C. and the chlorosulphonic acid solution was employed in amount containing approximately two molecular equivalents of chlorosulphonic acid per mole of styrene chemically combined in the polystyrene that was treated therewith. Precipitation occurred when about one-fourth of the chlorosulphonic acid solution had been added to the polystyrene solution. Stirring was difficult during addition of the remainder of the chlorosulphonic acid solution. The product was water-insoluble and did not cause an appreciable increase in viscosity when added to water. A portion of the product was analyzed and founl to contain an average of 0.58 sulphonic acid radical, and an average of 0.24 chlorosulphonyl, i. e. $ClSO_2$—, radical, per mole of styrene chemically combined therein.

In another experiment, a solution of 10 grams of polystyrene (containing approximately 0.1 mole of chemically combined styrene) in 100 cubic centimeters of carbon tetrachloride was added gradually and with stirring to a solution of 8 cc. (0.125 mole) of chlorosulphonic acid in 200 cc. of ethylene chloride, while maintaining the mixture at approximately 30° C. A sulphonated product was formed and precipitated during addition of the polystyrene solution The product was separated and tested as in the foregoing experiments. It was partly insoluble and partly dispersible with water. The portion (probably about half) of the product which was dispersible with water thickened the latter. A portion of the product was analyzed and found to contain an average of 0.78 sulphonic acid radical and 0.20 chlorosulphonyl radical per mole of styrene chemically combined therein.

In a further experiment, a solution of 100 cc. (1.56 moles) of chlorosulphonic acid in 1980 cc. of ethylene chloride and a separate solution of 139 grams (1.33 moles) of polystyrene in 1980 cc. of carbon tetrachloride were simultaneously fed, each at a rate of 30 cc. per minute, into admixture with one another while stirring and maintaining the mixture at approximately 22° C. Sulphonated polystyrene was formed almost immediately and was precipitated as hard individual granules during flow of the starting materials to the reaction zone. The product was separated and tested as in the preceding experiments It was entirely dispersible in water and thickened the latter. It was found, by analysis, to contain an average of 0.81 sulphonic acid radical per mol of styrene chemically combined therein and was almost free of chlorosulphonyl radicals. It was sulphonated polystyrene of a quality well suited for use in thickening aqueous liquids.

*Example 2*

Polystyrene having a solution viscosity of 36 centipoises at 25° C. was employed in this experiment. A reaction vessel was charged with 264 grams of dry methyl chloroform. There were then simultaneously fed to the vessel: (1) a solution of 57.7 grams of the polystyrene in 1090 grams of methylchloroform at a rate of 6.2 ml. per minute and (2) a solution of 29.0 grams of chlorosulphonic acid (of 95.5 per cent purity) in 287 grams of methyl chloroform at a rate of 3.9 ml. per minute, while vigorously stirring the resultant mixture and maintaining it at a temperature of about 21° C. The feed rates just given are those necessary for simultaneous introduction of one molecular equivalent of chlorosulphonic acid and of polystyrene, in amount containing approximately one molecular equivalent of chemically combined styrene, to the reaction. Almost immediately after starting the feed, formation and precipitation of sulphonated polystyrene was observed. The starting materials were fed to the reaction for a period of 30 minutes. The mixture was then filtered to separate the sulphonated polystyrene and adhering solvent was evaporated from the product. The acid form of the sulphonated polystyrene was thus obtained as a free-flowing, white, granular material which retained minor amounts of adhering chlorosulphonic acid and sulphuric acid. An approximately 0.5 gram portion of this product was readily dispersed in 100 ml. of water with formation of an aqueous colloidal solution having a viscosity of 1860 centipoises at 25° C. Another portion of the product was washed with diethyl ether, to remove the adhering chlorosulphonic acid and sulphuric acid, and dried. A 0.5 gram sample of this purified product was dispersed in 100 ml. of water, whereby there was formed an aqueous colloidal solution having a viscosity of 9,250 centipoises at room temperature. Another sample of the purified product was thoroughly dried by heating the same at 100° C. and 6 mm. absolute pressure for 20 minutes. One gram of this dried product was neutralized with 4.42 ml. of a one-normal aqueous sodium hydroxide solution. From this result it was calculated that the product contains an average of 0.71 sulphonic acid radical per mole of styrene chemically combined therein. For convenience, an extent of sulphonation, properly expressed as just set forth, will hereinafter be referred to as the "per cent sulphonation."

*Example 3*

Polystyrene, having a solution viscosity of 13.8 centipoises at 25° C., was sulphonated and the product was separated and purified by procedures similar to those described in Example 2. The product was 65.5 per cent sulphonated. A 0.5 gram sample of the product was dispersed in 100 ml. of water with formation of an aqueous colloidal solution having a viscosity of 16,000 centipoises at 25° C.

*Example 4*

The procedure of Example 2 was repeated, except that the polystyrene employed as a starting material possessed a solution viscosity of 4.7 centipoises at 25° C. The product was separated, dried, washed with ether and again dried. It was a white granular material and was found to be 57 per cent sulphonated polystyrene of good purity. A 0.5 gram portion of the sulphonated polystyrene was dispersed in 100 ml. of water with formation of a colloidal solution having a viscosity of 1100 centipoises at 25° C.

*Example 5*

This example describes a series of experiments wherein polystyrene was sulphonated under similar conditions, except for changes, from one experiment to another, in the kind of liquid used as a reaction medium. It shows that the results obtained are dependent in part on the kind and the viscosity of the medium employed. In all of the experiments, polystyrene having a solution viscosity of 36 was used as the material to be sulphonated. The kind and viscosity of the medium used in each experiment is set forth in the following table. In each experiment, a reaction vessel was charged with 200 cc. of the medium. There were then simultaneously fed to the vessel for a period of ½ hour: (1) a solution of 115.5 grams of polystyrene in 1650 cc. of the medium at a feed rate of 6.0 cc. per minute and (2) a solution of 19.4 cc. of chlorosulphonic acid of 95 per cent purity in 228.1 cc. of the medium at a feed rate of 3.83 cc. per minute, while stirring and maintaining the mixture at a temperature of about 22° C. The feed rates just given correspond to the simultaneous introduction of approximately 1.15 molecular equivalents of chlorosulphonic acid and 1 molecular equivalent of styrene (in the form of polystyrene) to the reaction. The product was separated by filtration, washed with ether, and dried. One gram of each product was added to 200 cc. of water and the mixture was neutralized by titration with a one-normal aqueous sodium hydroxide solution. From the amount of sodium hydroxide required for the neutralization, the extent of sulphonation of the polystyrene was calculated. The neutralized mixture was agitated, for purpose of dissolving or dispersing the sodium polystyrene sulphonate in the water. Certain of the products dissolved readily, but others failed to dissolve. In each instance, the viscosity of the solution, or of the aqueous phase of the resultant mixture, was determined. The table names each liquid tested as a reaction medium and gives its viscosity, in centipoises at 20° C. It also gives the per cent sulphonation of each sulphonated polystyrene product and gives the viscosity, in centipoises at 20° C., of the aqueous solution, or of the aqueous phase of the mixture comprising the sodium salt of the product. The products obtained in runs 1–4 of the table dissolved, or dispersed, readily in the water, but the products of runs 5–9 were either insoluble or only partially soluble, i. e. dispersible, in water.

TABLE

| Run No. | Medium | | Product | |
|---|---|---|---|---|
| | Kind | Viscosity, Cps. | Percent Sulphonation | Viscosity, Cps. |
| 1 | Methylchloroform | 0.806 | 66.0 | 5,000 |
| 2 | Carbon Tetrachloride | 0.969 | 79.6 | 2,600 |
| 3 | Tetrachloroethylene | 0.876 | 67.7 | 2,250 |
| 4 | o-Dichlorobenzene | 0.919 | 75.7 | 1,710 |
| 5 | Trichloroethylene | 0.63 | 77.7 | 40 |
| 6 | Methylene Chloride | 0.441 | 79.3 | 30 |
| 7 | Nitrobenzene | 2.03 | 62.0 | (¹) |
| 8 | Trans-1,2-dichloroethylene | 0.42 | 59.0 | 1 |
| 9 | Chloroform | 0.58 | 13.0 | 1 |

¹ Between 1 and 2.

From the table, it will be seen that the liquid chlorinated hydrocarbons having viscosities of 0.8 centipoise and higher are far more effective than the other liquids as the reaction media for the production of a water-dispersible resin sulphonate having a thickening action toward water. In general, liquid chlorinated hydrocarbons having viscosities of from 0.8 to 1.0 are preferably used as the media.

*Example 6*

A solution of a solid polymer of alpha-methylstyrene (which polymer had a solution viscosity of 14) in methylchloroform and a solution of chlorosulphonic acid in methylchloroform were fed into admixture with one another at rates corresponding to the introduction of 1.3 molecular equivalents of chlorosulphonic acid per mole of alpha-methylstyrene chemically combined in the polymer thereof. Except for the rates of feed of the reactants, the procedures in carrying out the reaction and in separating and testing the sulphonated polymer product were similar to those described in Example 5. There was obtained a white granular sulphonated polymer that was readily and completely dispersible in water. An aqueous dispersion of the product, containing 0.55 per cent by weight of the latter as a sodium salt thereof, had a viscosity of 8,000 centipoises at 25° C.

*Example 7*

A solid copolymer of 50 per cent by weight styrene and 50 per cent ar-chlorostyrene, which copolymer had an intrinsic viscosity of 114 centistokes, was sulphonated in accordance with the invention by procedure similar to that described in Example 5. The sulphonated polymer was filtered from the reaction mixture, washed with ether, dried, and converted to the sodium salt thereof. A sample of the sodium salt of the sulphonated polymer was dispersed in water to form a colloidal solution containing 0.55 per cent by weight of said salt. This colloidal solution had a viscosity of 3,100 centipoises at 25° C.

In the claims, the term "polymer" pertains generically to homopolymers and copolymers.

Other modes of applying the principle of the invention may be employed instead of those explained, change being made as regards the method herein disclosed, provided the step or steps stated by any of the following claims, or the equivalent of such stated step or steps, be employed.

I therefore distinctly point out and claim as my invention:

1. A method of sulphonating an alkenyl aromatic resin, consisting of a benzene-soluble polymer containing, in chemically combined form, at least 50 per cent by weight of at least one alkenyl aromatic compound having the general formula:

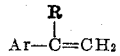

wherein Ar represents a monovalent aromatic radical and R is a member of the group consisting of hydrogen and the methyl radical, to make a corresponding resin sulphonate that is dispersible in water with formation of a colloidal solution having a viscosity higher than that of water, which method comprises feeding into admixture with one another chlorosulphonic acid and a solution of the alkenyl aromatic resin in a liquid polychlorinated hydrocarbon, which polychlorinated hydrocarbon has a viscosity of between 0.8 and 1 centipoise at 20° C. and serves as a reaction medium, to form a mixture in which the amount of resin employed corresponds to less than 8 per cent of the combined weight of the same and said medium, while stirring and maintaining the reaction mixture at temperatures between −10° and 40° C., the rates of feed of the chlorosulphonic acid and the alkenyl aromatic resin into admixture with one another being such as to correspond to the introduction of between 0.55 and 1.4 molecular equivalents of chlorosulphonic acid per aromatic nucleus of the resin.

2. A method, as claimed in claim 1, wherein the liquid polychlorinated hydrocarbon possesses a viscosity of from 0.8 to 1 centipoise at 20° C., the rates of feed of the starting materials correspond to the introduction of between 0.7 and 1.2 molecular equivalents of chlorosulphonic acid per aromatic radical of the resin starting material, and the reaction mixture is maintained at temperatures between 10° and 35° C. during mixing of the reactants.

3. A method, as claimed in claim 2, wherein the alkenyl aromatic resin is polystyrene.

4. A method, as claimed in claim 2, wherein the liquid polychlorinated hydrocarbon is methylchloroform.

5. A method, as claimed in claim 2, wherein the resin is a polymer of at least one alkenyl aromatic compound having the general formula:

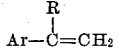

wherein Ar represents a monovalent aromatic radical and R is a member of the group consisting of hydrogen and the methyl radical as the only polymerizable organic material chemically combined therein.

References Cited in the file of this patent

UNITED STATES PATENTS

| Number | Name | Date |
|---|---|---|
| 2,031,929 | Breuers | Feb. 25, 1936 |

FOREIGN PATENTS

| Number | Country | Date |
|---|---|---|
| 580,366 | Germany | July 13, 1933 |